No. 754,460. PATENTED MAR. 15, 1904.
D. W. KNEISLY.
LABELING MACHINE.
APPLICATION FILED NOV. 5, 1902.
NO MODEL. 8 SHEETS—SHEET 1.
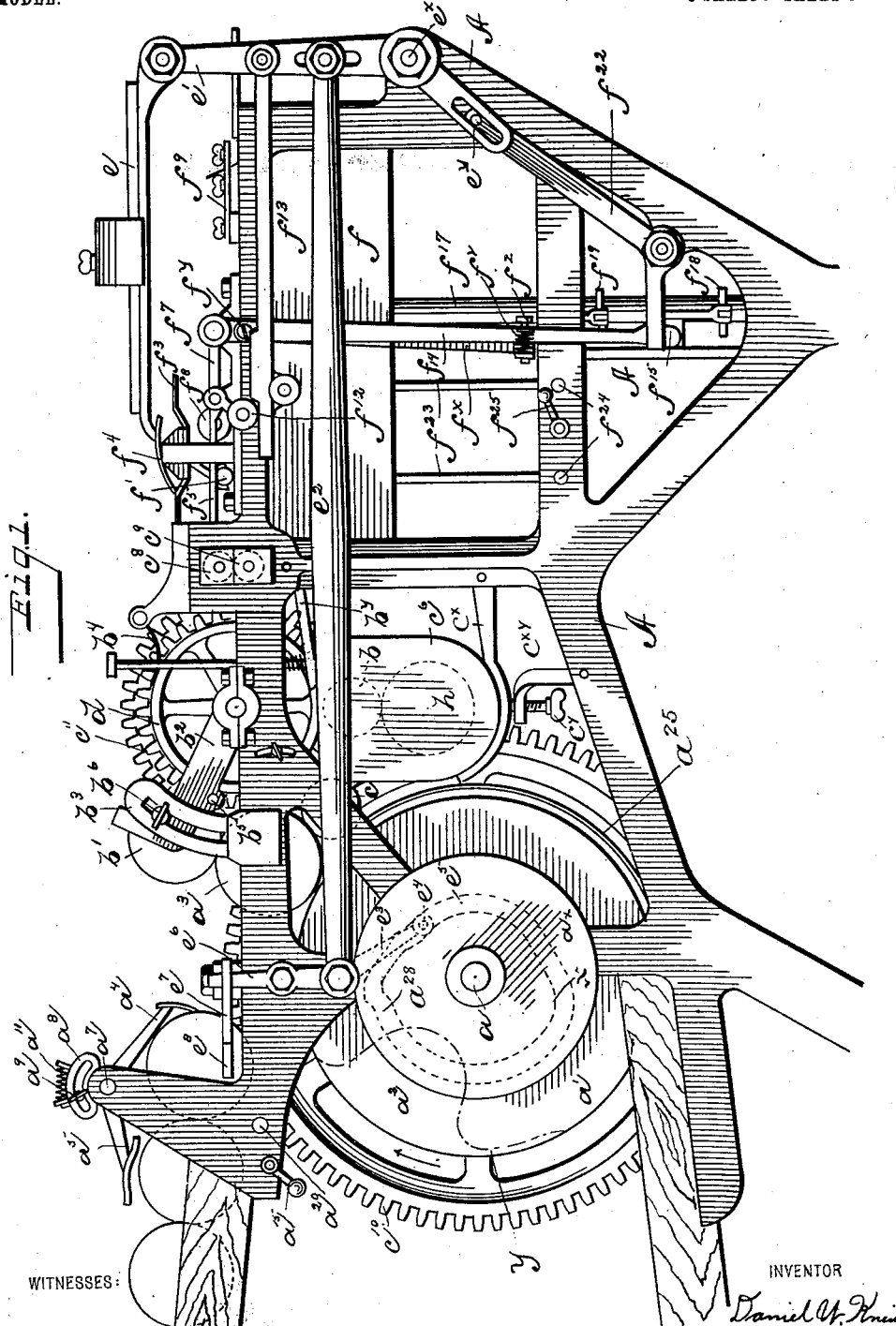
WITNESSES:
INVENTOR
Daniel W. Kneisly
BY
Staley & Bowman
ATTORNEYS.

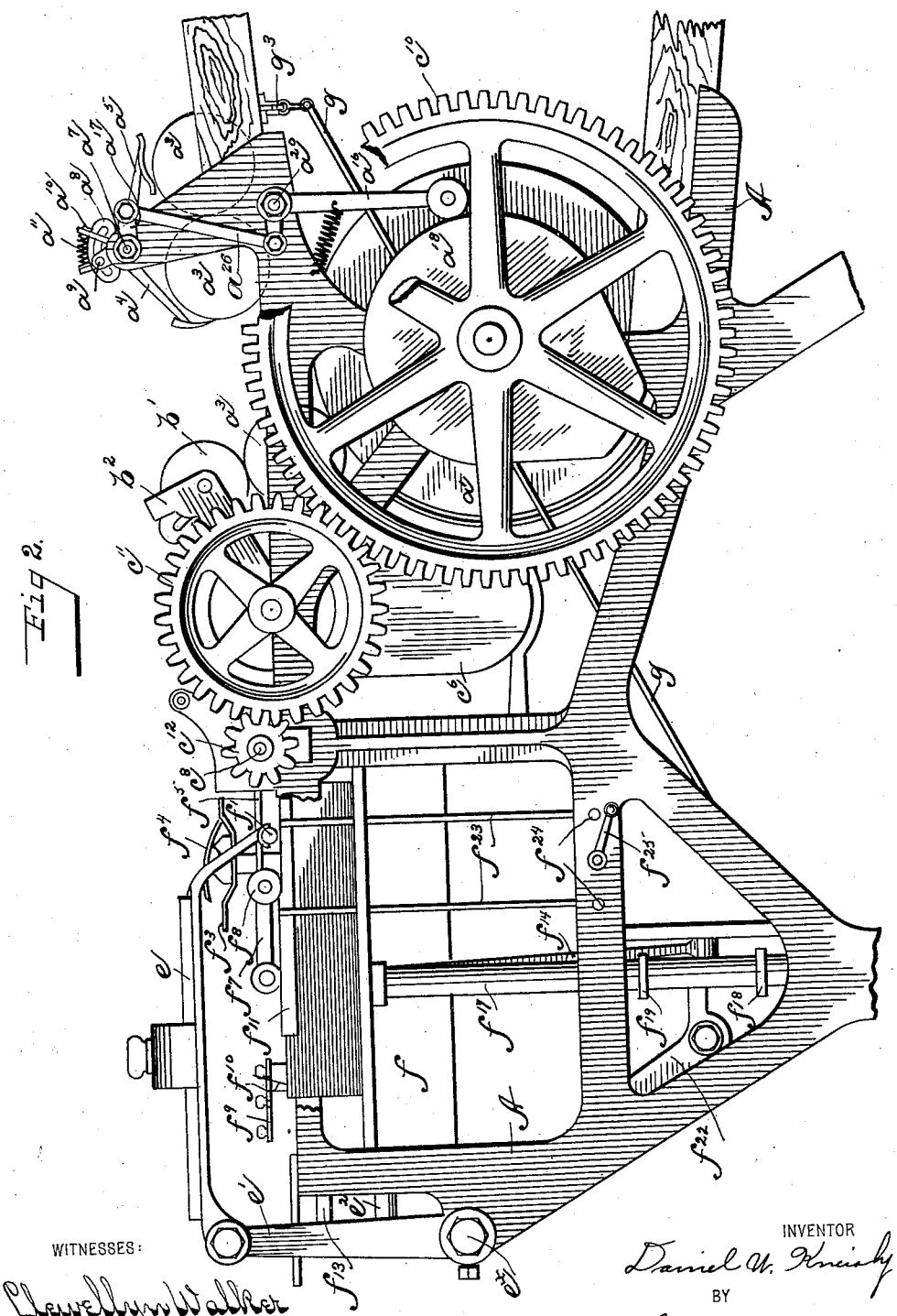

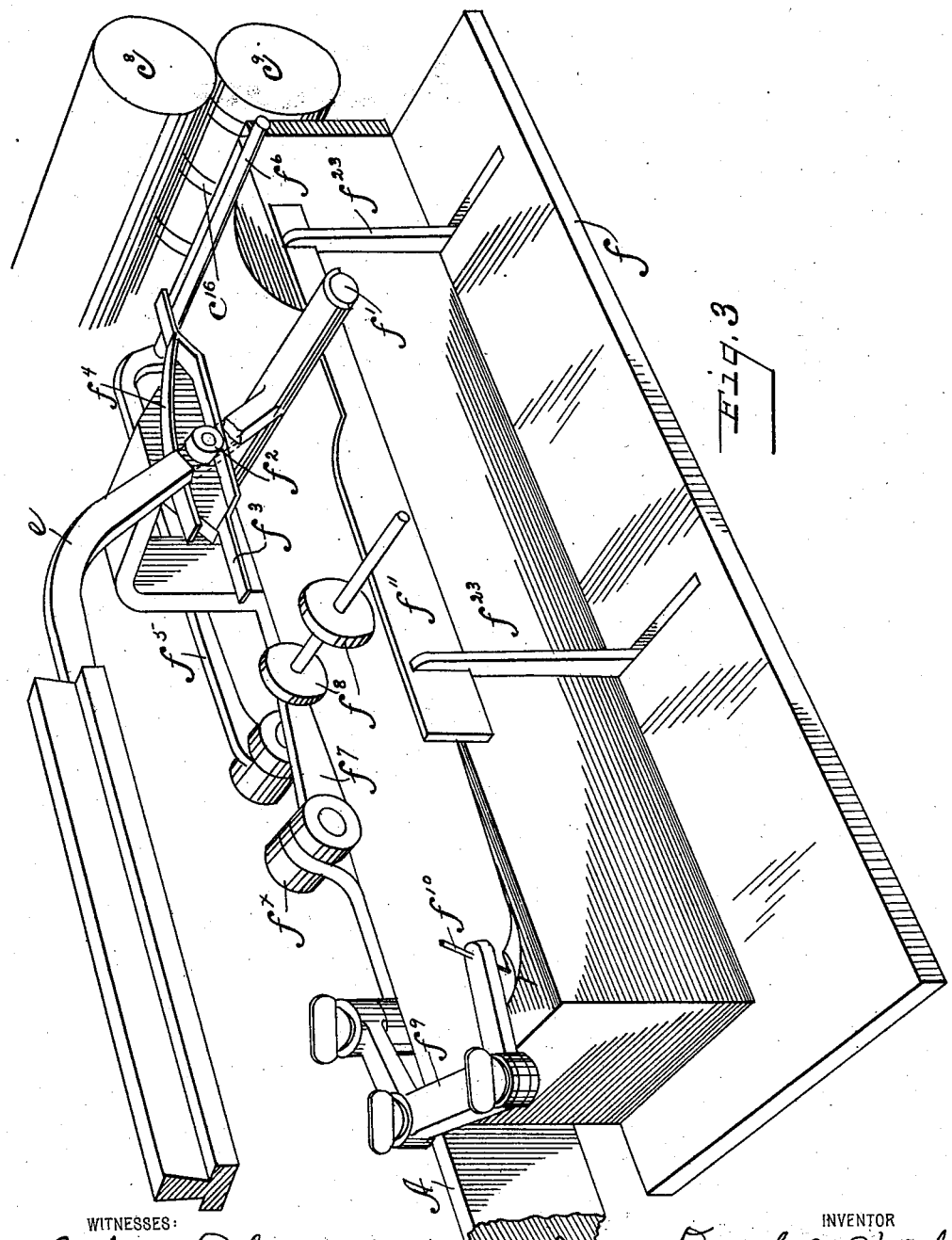

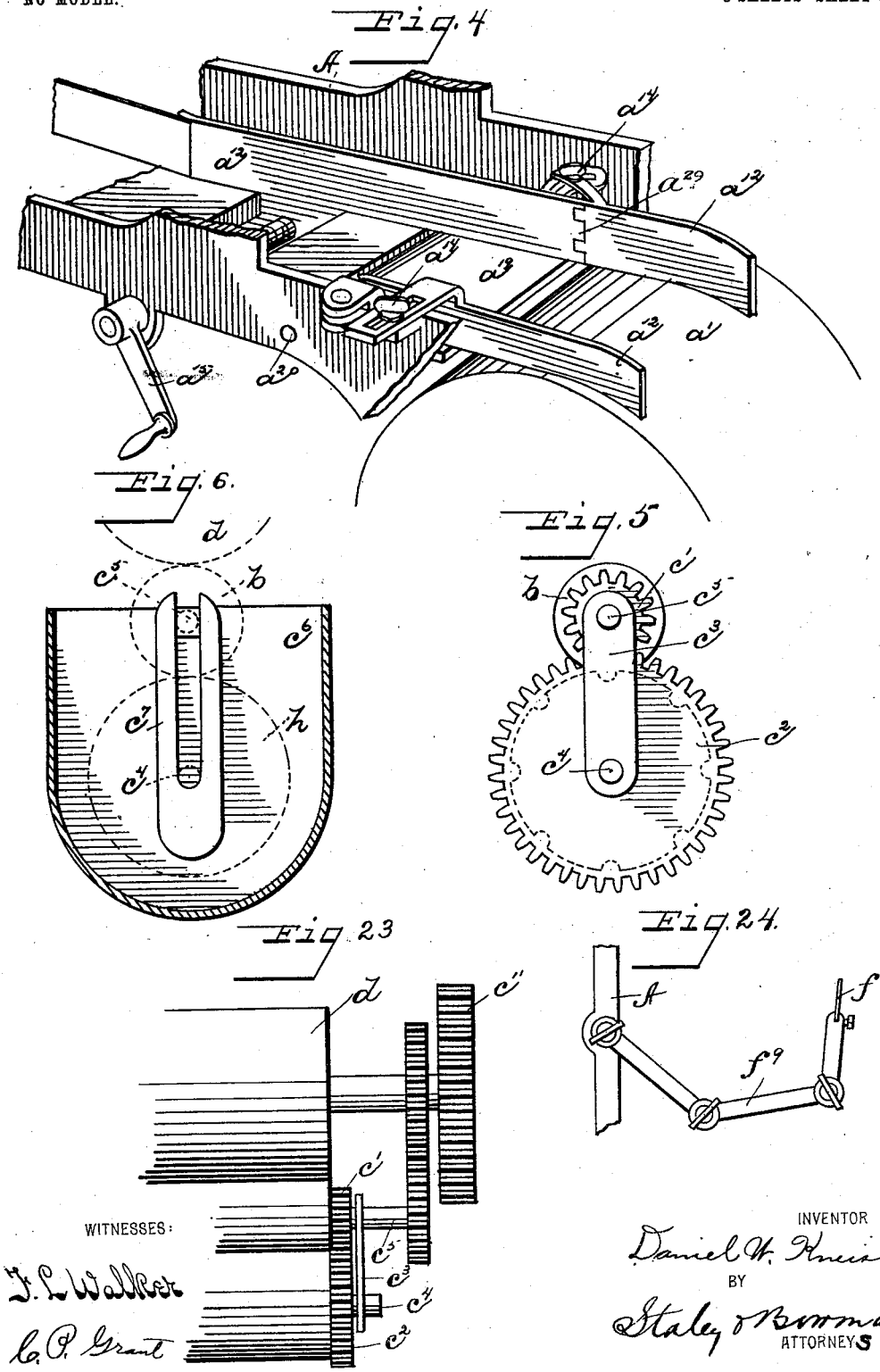

No. 754,460. PATENTED MAR. 15, 1904.
D. W. KNEISLY.
LABELING MACHINE.
APPLICATION FILED NOV. 5, 1902.
NO MODEL. 8 SHEETS—SHEET 5.
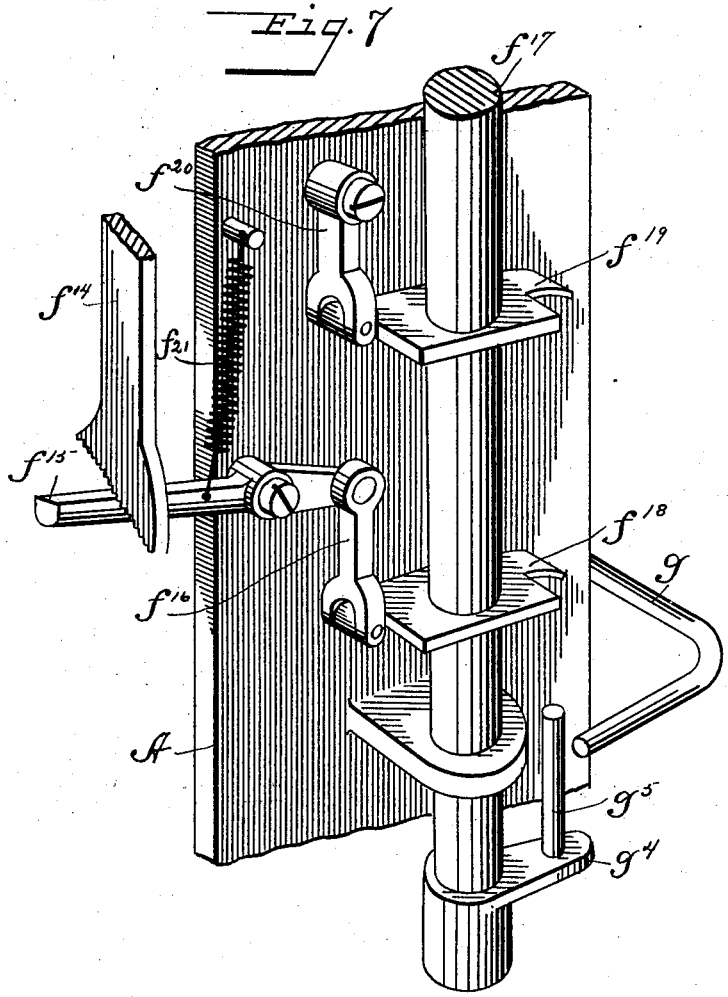
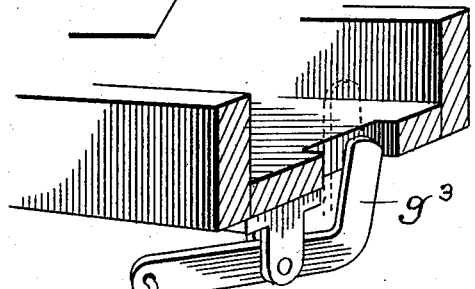

No. 754,460. PATENTED MAR. 15, 1904.
D. W. KNEISLY.
LABELING MACHINE.
APPLICATION FILED NOV. 5, 1902.
NO MODEL. 8 SHEETS—SHEET 6.
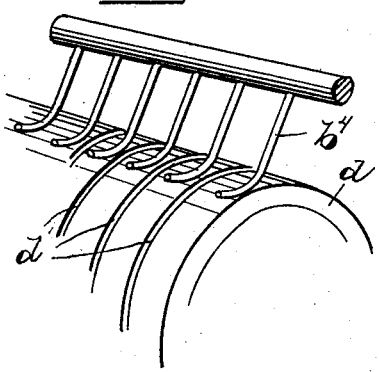
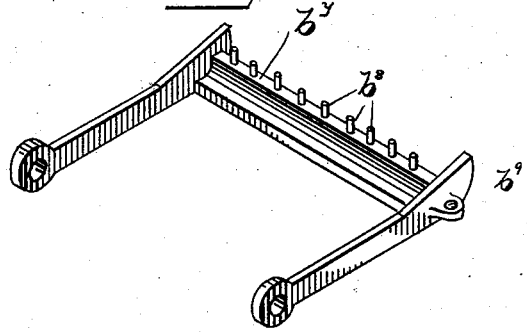
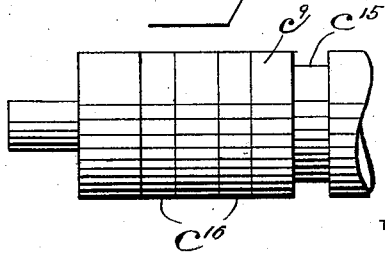
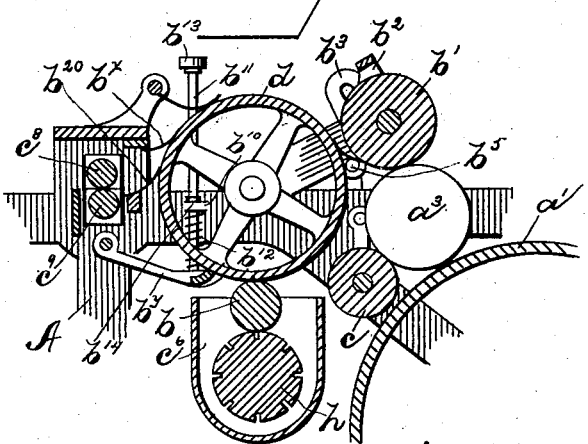
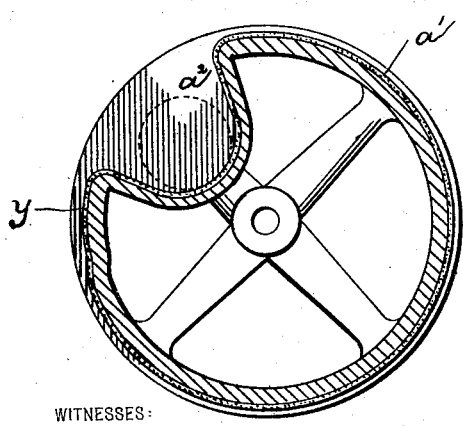
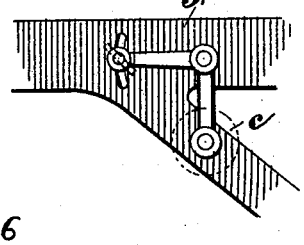
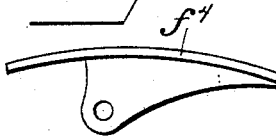
WITNESSES: INVENTOR
Daniel W. Kneisly
BY
Staley & Bowman
ATTORNEYS

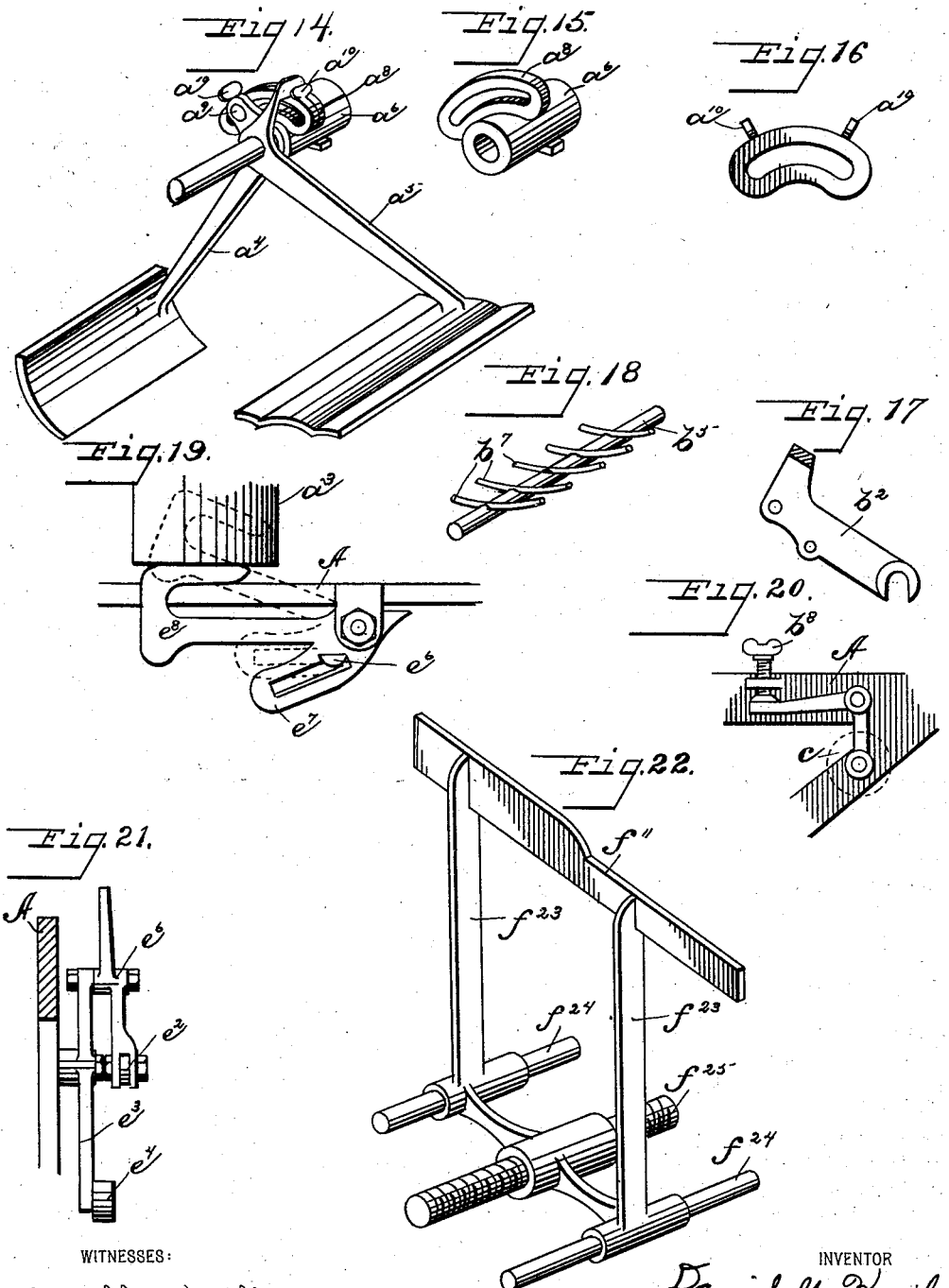

No. 754,460. Patented March 15, 1904.

UNITED STATES PATENT OFFICE.

DANIEL W. KNEISLY, OF DAYTON, OHIO, ASSIGNOR OF TWO-THIRDS TO GEORGE H. KRAMER AND FRANK J. KRAMER, OF DAYTON, OHIO.

LABELING-MACHINE.

SPECIFICATION forming part of Letters Patent No. 754,460, dated March 15, 1904.

Original application filed September 20, 1901, Serial No. 75,971. Divided and this application filed November 5, 1902. Serial No. 130,124. (No model.)

*To all whom it may concern:*

Be it known that I, DANIEL W. KNEISLY, a citizen of the United States, residing at Dayton, in the county of Montgomery and State of Ohio, have invented certain new and useful Improvements in Labeling-Machines, of which the following is a specification.

My invention relates to improvements in machines for labeling cans and similar devices. The object of my invention is to provide improved means for feeding cans of different diameters and lengths, as well as irregular shapes, into the machine and properly labeling the same, and, further, I provide means to apply labels of varying widths to cans of different dimensions in the desired position.

A further object of my invention is to provide improved means to control the distribution of the paste, some labels requiring an even while others demand an uneven distribution of it.

A further object is to provide improved means to regulate the height of the labels in their relation to the feeding devices, as well as improvements in the feeding and pasting devices.

This application is in the nature of a division of my application, Serial No. 75,971, filed September 20, 1901, upon which Patent No. 716,434 was granted December 23, 1902, as to some of its features, while other features are improvements over the constructions shown in said application, as will hereinafter more fully appear.

In the drawings hereto attached, Figures 1 and 2 are side elevation views of said machine. Fig. 3 is a detail view of the label-feeding mechanism. Fig. 4 is a detail view of the can-feeding mechanism. Figs. 5 and 6 are detail views of the paste-distributing rollers. Fig. 7 is a detail view of the clutch mechanism for operating the label-holding table. Fig. 8 is a detail of the device for regulating the feed of the cans. Fig. 9 is a detail view of the device for deflecting the labels. Fig. 10 is a detail of the scraper. Fig. 11 is a detail view of one of the feed-rollers. Fig. 12 is a vertical sectional view of the roller mechanism. Fig. 13 is a sectional view of the pulley for moving the cans. Fig. 14 is a detail of the mechanism for regulating the feed of the cans. Figs. 15 and 16 are detail views of parts thereof. Fig. 17 is a detail view of the arm for supporting one of the rollers. Fig. 18 is a detail view of the device used for directing the label to the pressure-roller. Fig. 19 is a detail view of the devices for regulating the feed of the labels. Fig. 20 is a detail of the adjusting device for one of the rollers. Fig. 21 is a sectional view of the connecting parts between the label-feeding mechanism and the main operating-shaft. Fig. 22 is a detail of the part of the frame of the label-holding table, showing the means for allowing for varying widths of labels. Fig. 23 is a detail of the paste-rollers and gearing. Fig. 24 is a detail of the needle supported by three links. Fig. 25 is a detail of the adjusting device for the end of the roller opposite the end shown in Fig. 21. Fig. 26 is a detail of part of the label-feeding mechanism. Fig. 27 is a plan view of the machine.

Like parts are represented by similar letters of reference in the several views.

In the said drawings the frame of the machine is marked A. The main shaft $a$, journaled in suitable bearings on said frame, is operated by power in any usual way, and on this shaft there is shown a large supporting-roller $a'$, having an opening or pocket $a^2$ (dotted lines, Fig. 1) for carrying the cans or other devices after same have been properly labeled to the point of delivery from the machine. In Fig. 1 is shown a thin piece of sheet-iron $a^{25}$, extending from the two bars of the frame and immediately adjacent to the rim of the roller for holding the can within the pocket $a^2$. There is also shown in Fig. 13 the periphery of the wheel or roller $a'$, covered with fabric for the purpose of pressing the labels on the cans with a yielding action. The cans are delivered to the roller at the point marked $y$.

The arm $a^4$, with a projecting claw, is journaled on the shaft $a^7$, which shaft is supported by the frame of the machine. The sleeve $a^6$ is also rigidly secured on said shaft and is preferably integrally formed with the link-shaped part $a^8$. (Shown in Fig. 15.) A corresponding link-shaped part (shown in Fig. 16) is placed upon the sleeve, and a set-screw $a^9$ passes through the slotted openings in said link-shaped parts and through an opening in the projecting lug of the arm $a^4$, and thereby binds securely the arm $a^4$ to the sleeve and shaft, so that when the shaft $a^7$ is moved the arm $a^4$ will likewise be moved. The other arm $a^5$ has also a lug at the upper end thereof, and said arm $a^5$ is loosely journaled on the shaft $a^7$. One end of the spring $a^{11}$ is fastened to the lug of said arm $a^5$, and the other end of said spring is fastened to one of the lugs $a^{10}$ of the link, (shown in Fig. 16,) the other lug $a^{10}$ acting as a stop for the arm $a^5$.

In normal position when the claw of the arm $a^5$ rests above the second can the spring will hold the projecting part of the arm $a^5$ yieldingly against the lug $a^{10}$. In the moment of releasing the first can the claw of the arm $a^5$ drops down and presses upon top of the second can. The further movement of the shaft $a^7$ and arm $a^4$ upward will force the lug $a^{10}$ away from the projection of the arm $a^5$ and the second can will be positively held by the claw of the arm $a^5$ without danger of crushing the can or article to be labeled. The further upward movement of the arm $a^4$ is against the tension of the spring $a^{11}$, and said arm continues to rise until the can is released from the claw of said arm. The result of this construction is that the can to be fed into the machine is not released from the claw of said arm $a^4$ until the next succeeding can is held from advancing by the claw of the arm $a^5$.

In machinery of this kind it is desirable to provide for different-sized cans, and the regulating device I have described can be easily adjusted by loosening the thumb-screw $a^9$ and by moving the link $a^8$, thereby changing the position of both of the arms $a^4$ and $a^5$ so as to make the distance between the claws of the arms greater or less, as may be desired, the tension of the spring remaining constant. The claw of the arm $a^5$ is corrugated to allow for different sizes of cans. The adjustment is made by raising or lowering the arm $a^4$ until to the proper position, as shown by the indicator or by actual use. The other arm $a^5$ is then adjusted to its position, and this is done by the sliding and rolling movement of the link, the tension of the spring remaining constant. The thumb-screw $a^9$ is then tightened.

After the can to be labeled is fed into the machine it is supported by the wheel or roller $a'$ and is held between the roller $b'$ and $c$, the label being first pressed against the can by the roller $b'$, as will be more fully explained. For the purpose of distinguishing the rollers the roller $b'$ is termed the "pressure-roller" and the roller $c$ the "holding-roller."

The roller $b'$ is supported upon the yoke $b^2$, which fits over the shaft of the pasting-wheel $d$. (See Figs. 1, 17, and 27.) The roller $b'$ is loosely journaled in said yoke and the labels initially pressed and pasted on the can $a^3$ by means of said roller.

The yoke $b^2$ (the arms of which are formed as shown in Fig. 17) is supported on the shaft of the pasting-wheel $d$ in such manner that the yoke $b^2$ may be moved upwardly or downwardly to allow for varying sizes of cans. The scraper $b^y$ is for the purpose of preventing the accumulation of paste. The thumb-screw $b^6$ is used to hold the arm $b^2$ securely to the slotted arm $b^3$ when the proper adjustment has been made. The labels are fed to the pressure-roller $b'$ after passing partly around the paste-wheel $d$, as shown in Fig. 12, and the part $b^{20}$ is for the purpose of directing the label upwardly to the pasting-wheel. The parts $b^4$ and $b^x$ are for smoothing the ends of the labels after being directed on the paste-wheel, and the part $b^5$ is for deflecting the labels from the paste-wheel to the pressure-roller. The roller $b$ is journaled in the frame and contacts with the pasting-wheel $d$, and the roller $h$ has openings on its periphery, as shown in Fig. 12, for conveying the paste from the paste-receptacle to the roller $b$, which in turn conveys the paste to the wheel $d$. The shaft $c^5$ of the roller $b$ is connected to the shaft $c^4$ of the roller $h$ by means of the link $c^3$, and the ends of said shaft fit within the slotted opening of the arm $c^7$, which extends upwardly from the side of the paste-box. The paste-box $c^6$ rests on an arm $c^x$, pivoted at one end to the main frame, and the free end of said arm rests on the upper end of a set-screw $c^y$, which operates through a screw-threaded perforation in a brace $c^{xy}$, secured to the main frame. By turning the thumb-screw the paste-box is adjusted vertically.

The pasting-wheel $d$ is provided with peripheral grooves $d'$, as shown in Fig. 9, and the part $b^5$ is provided with a series of fingers $b^7$, adapted to stand opposite and enter the grooves $d'$ of the wheel $d$ for the purpose of more readily deflecting the labels from said paste-roll to the pressure-roller. The scraper $b^y$ is also provided with fingers $b^8$ (shown in Fig. 10) for the purpose of entering the grooves on said paste-roll and cleaning said grooves of surplus paste. The amount of paste required varies with the quality and thickness of the label to be applied, and for this reason I make the scraper $b^y$ adjustable in its relation to the pasting-roll. For this purpose I provide each end of the scraper $b^y$ with a perforated lug $b^9$, said perforations being screw-threaded, and on the frame I further provide perforated lugs $b^{10}$, through which stems or rods $b^{11}$ extend, said rods having screw-threaded ends to engage perforations in the lugs $b^9$. Collars $b^{14}$ on said rods rest on the lugs $b^{10}$. I further provide springs $b^{12}$ on said rods between the lugs $b^9$ and $b^{10}$ to normally hold the scraper away from the pasting-roll. The scraper can be adjusted to the roll by turning the handles $b^{13}$, fixed to the rods. In some cases, such as baking-powder cans, it is necessary to have the paste thicker on one side, and by providing the adjusting devices at each end of the scraper, as described, I am able to distribute the paste thicker at one end than the other, as desired.

The roller $b$ has the pinion $c'$ on the shaft $c^5$ of said roller of smaller diameter than the roller itself, gearing with a pinion $c^2$ of larger diameter than the roller $h$, and by means of the link connections shown in Fig. 5 the relative positions of the rollers $b$ and $h$ are always kept the same; but the surface speed of the roller $b$ is greater than that of the roller $h$, causing a slipping motion of the roller $b$ upon the roller $h$, which results in an improved method of transferring the paste from the receptacle to the wheel $d$. A pinion on said shaft $c^5$ gears with a pinion on the shaft of the paste-wheel $d$, and the ratio between the gear-teeth is such that there is a difference between the surface speed of the roller of the paste-wheel and the roller $b$, thereby causing a slipping motion between the paste-wheel and the roller.

The feed-rollers for the labels (marked $c^8$ and $c^9$) are loosely journaled in the frame $a$, as shown in Figs. 1 and 2, and said roller $c^9$ is formed with grooves $c^{15}$, as shown in Fig. 11, within which are fitted bands of rubber $c^{16}$, as indicated in Figs. 3 and 11, such that there are alternate bands of rubber and bands of steel. The construction of this feed-roller $c^9$ is such that it is more easily revolved by contact with the roller $c^8$ and is adapted to feed the paper between the rolls in an improved manner.

The pinion $c^{10}$ on the shaft $a$ gears with the pinion $c^{11}$ on the shaft of the paste-wheel, and said pinion $c^{11}$ is geared to a spur-wheel $c^{12}$ on the shaft of the feed-roller $c^8$, so that motion is thereby transmitted directly from the main operating-shaft $a$ to the feed-roller $c^8$.

The arm $e$ for feeding the labels is pivoted to the rocking arm $e'$, and said rocking arm is rigidly fastened to the shaft $e^x$. The slotted link $e^y$ is also rigidly fastened to the shaft $e^x$, as shown in Fig. 1. The connecting-rod $e^2$ is attached within the slot of the rocking arm $e'$, and the other end of said connecting-rod $e^2$ is fastened to the end of the rocking lever $e^6$, which is in turn pivoted on the upper end of the crank $e^3$, having the roller $e^4$ adapted to fit within the groove $e^5$ of the cam on the outside of the frame, as shown in Fig. 1. The upper end of the rocking lever $e^6$ extends within the slotted opening in the arm $e^7$ of the pivoted catch $e^8$, as shown in Fig. 19. A small offset in the inner end of said slotted opening permits the end of the rocking lever $e^6$ to rest within the same and forms a fulcrum for said lever so long as the catch $e^8$ is held in its normal position by the contact of the catch with said can. The can $a^3$ holds the catch $e^7$ in the position shown in Fig. 19, so that the end of the rocking lever $e^6$ is fulcrumed in the offset of the arm $e^7$, and when the supply of cans is exhausted the end of said lever $e^6$, pressing against the shoulder of the offset, throws the catch into the position shown in dotted lines in Fig. 19, then sliding past said offset, and the lever $e^6$ is no longer fulcrumed in the offset, but is fulcrumed in the end of the connecting-rod $e^2$, allowing the end of said lever $e^5$ to move freely within said slot. The catch $e^8$, as shown in Fig. 19 in full lines, contacts with the can $a^3$. This is due to the end lever $e^6$ being fulcrumed at the forward shoulder of the offset in the slot.

Referring to the label-feeding mechanism, I have shown the feeding-arm $e$ with the bar $f'$, having a rubber covering or covering of similar substance, which bar is used for pressing the labels toward the feed-rollers $c^8$ and $c^9$. The arm $e$ has the roller $f^2$, which when the supply of labels is exhausted contacts with the bar $f^3$, attached to the frame of the machine.

When there are labels to be fed, the roller $f^2$ rests above said bar $f^3$ and between the bars $f^3$ and pivoted bar $f^4$. The construction of the machine is such that the speed of movement of the feeding-arm $e$ is varied, and in Fig. 3 there is shown the feeding-arm advanced in its forward movement. The mechanism is such that the feed-arm remains stationary at two different periods of time—to wit, at the end of the forward movement and at the end of the backward movement. At the end of the forward motion the roller $f^2$ raises the inner of the bar $f^4$ and rests upon the inner end of the bar $f^3$. During the backward movement the bar $f'$ is kept above the labels by the roller rolling on the bar $f^4$ until the roller passes the pivoted point of the bar $f^4$. The bar $f^4$ then begins to drop down an incline, and when the feed-arm reaches almost the limit of its backward movement it rolls on the end of the bar $f^3$, releasing the end of the bar $f^4$, which swings back to normal position. The lever $f^5$ has the foot $f^6$, which normally rests upon the labels at the ends thereof and holds same down in their proper positions. The governing-arm $f^7$ is also pivoted to the frame of the machine and has the roller $f^8$, which rests lightly upon the labels. The link $f^9$ has the needle $f^{10}$, arranged in such manner, as shown in Fig. 3, that the needle is directed in a slanting direction, with the point resting against the ends of the labels, and the position of the needle is adjustable for different lengths of labels. The needle is shown supported by a three-link arm. The first forward movement of the bar $f'$ is a slow movement until it buckles the top label, as shown in Fig. 3. The movement then becomes faster, and the bar $f'$ moves at the same rate of speed as does the feed-roller $c^8$, and after the foot $f^6$ is raised the feed-arm $e$ gives the label a quick movement toward the feed-rolls. The rollers $f^8$ are shown on the rod, which is adapted to rest upon the guide-plate $f^{11}$ when the supply of labels is exhausted. The crank-lever $f^5$ has a roller $f^{12}$, which rests upon the arm $f^{13}$, extending from and connected with the rocking arm $e'$. The raised portion of the arm $f^{13}$ (shown in Fig. 1) is adapted to contact with the roller, and thereby raise the foot $f^6$, which extends from the end of the lever $f^5$ for the purpose of allowing the label to be moved quickly forward by the feed-arm $e$, as hereinbefore explained.

An arm of the governing-arm $f^7$ is shown extending downwardly, and the foot of the said arm is preferably formed with notches, which regulate the stroke of the table mechanism hereinafter to be described. To permit adjustment, this downwardly-extending arm is made in two parts—an arm $f^x$, rigidly connected to the arm $f^7$, and a supplementary arm $f^{14}$, pivoted to said arm $f^x$ at $f^y$. A perforated lug is provided at the extremity of the arm $f^x$ and a corresponding lug on the arm $f^{14}$. Extending through these lugs and engaging with the lug on the arm $f^x$ is a screw $f^z$. By means of the screw $f^z$ operating against the tension of the coil-spring $f^v$, interposed between the respective lugs, the relation of the arms $f^x$ and $f^{14}$ may be varied, bringing the inclined notched foot of the arm $f^{14}$ more or less directly over the lever $f^{15}$, and so limiting the stroke of said lever. This arrangement enables the operator to more quickly and readily vary and adjust the length of the stroke to the various thickness of the labels to be fed. When sufficient labels are placed on the table so that the top label is in alinement with the line of contact of the feed-rolls $c^8$ and $c^9$, and therefore in a position to be fed properly between the said rollers, the foot of the arm $f^{14}$ rests above the lever $f^{15}$, and the bottom of the said lever being formed with a slanting end the parts are adjusted so that the arm $f^{15}$ is locked against any movement. The notched foot of the arm $f^{14}$ is arranged so that as said arm $f^{14}$ moves backwardly there is allowed an increasing movement of the arm $f^{15}$. This arm $f^{15}$ is pivoted to the frame A of the machine, and the stirrup $f^{16}$ connects the said arm to a clutch member $f^{18}$, as shown in Fig. 7. The bar $f^{17}$ supports the table $f^{18}$, extending downwardly through the clutch members $f^{18}$ and $f^{19}$, and the spring $f^{21}$ connects the frame A with the end of the arm $f^{15}$. A crank-lever $f^{22}$ (shown in Fig. 1) is pivoted to the frame, and the pin at the upper end fits within a slotted opening in the lower end of the link $e^j$. The clutch mechanism is such that when the lever $f^{15}$ is moved upwardly and downwardly the table $f$ is gradually raised by a step-by-step movement, and the length of the stroke or movement of the table and bar $f^{17}$ is regulated by the relative position of the downwardly-extending arm $f^{14}$, and the parts can be set in proper alinement by moving the arm $f^{14}$. In this construction of the mechanism a feeding device is shown which is automatic and one that adjusts itself quickly and readily to the varying conditions of the label-supply and the varying thickness of labels.

The operation of the mechanism thus far described consists in the shaft $a$ revolving the pulley or wheel $a'$ and the cam in the direction shown by the arrows in Fig. 1. In this Fig. 1 the parts are shown in the position when the can has just been labeled and is about to be dropped within the opening $a^2$ for the purpose of delivering same out of the machine. When the can that has been labeled is dropped within the opening $a^2$, the lower arm of the crank-lever $a^{16}$ is moved by the cam shown in Fig. 2, so that the arm $a^4$ is raised upwardly and the can $a^3$ is thereby released and allowed to enter the machine, the hinged bottom $a^{19}$ being simultaneously dropped. The movement of the roller $e^4$ within the cam-groove $e^5$ will by means of the connecting-rod $e^2$ move the rocking arm $e'$ forwardly and backwardly, so as to feed the labels up to the rollers $c^8$ and $c^9$, which in turn deliver the labels around the pasting-wheel $d$ by the assistance of the deflecting devices heretofore mentioned. The labels are fed through the rollers $c^8$ and $c^9$, passing around the upper part of the pasting-wheel and under the roller $b'$ and around said can, as shown in Fig. 12. The depression on said supporting-roller (shown in Fig. 1 as being located just back of the pocket $a^2$ and lettered $y$) is formed in such manner that the can $a^3$ is raised gradually until brought in contact with the pressure-roller $b'$, which insures a better application of the labels. The first movement of the projecting feeding-arm $e$, having the rod $f'$ bearing against the top label, is to buckle the top label into the position shown in Fig. 3, the extreme end of said label being held down by the foot $f^6$. After the top label has assumed the position shown in Fig. 3 by a further movement of the rocking arm $e'$ the foot $f^6$ is raised from the extreme end of the label. This is effected by the raised portion of the rod $f^{13}$ contacting with the roller $f^{12}$, as shown in Fig. 1. The end of the top label thereby quickly and easily moves to a point between the roller $c^8$ and $c^9$, the rod of the arm $e$ having continued to move forward, tending thereby to push the label toward the rollers until the roller $f^2$ is raised on the incline of the bar $f^3$ past the bar $f^4$. Upon the return movement of the connecting-rod $e^2$ the roller $f^2$ rolls on the top bar $f^4$, and the rod $f'$ is kept from contacting with the labels during the return movement. It will be readily understood that the first movement of the label results in the needle $f^{10}$ piercing the end of said label and raising it to the position shown in Fig. 3, which assists materially in separating the labels for feeding to the feed-rollers.

In the operation of the clutch mechanism the spring $f^{21}$ is put under tension by the end of the crank-lever $f^{22}$ which projects above the lever $f^{15}$ into the position shown in Fig. 7. This is done by means of the connections to the crank rocking arm $e'$, as shown in Fig. 1. When the rocking arm $e'$ is pushed backward by the connecting-rod $e^2$, the link $e^y$ forces the lower arm of said crank-lever $f^{22}$ downwardly, and the clutch member $f^{18}$ moves the table upwardly, and when the upper end of the lever $e'$ is pulled forward the said end of the lever $f^{22}$ is raised and the spring returns the lever $f^{15}$ and clutch member $f^{18}$ to normal position. The clutch member $f^{19}$ is formed to hold said bar $f^{17}$ while the clutch member $f^{18}$ slides on the bar $f^{17}$.

For the purpose of automatically stopping the feed of the cans when the supply of labels has been exhausted the rod $g$ is shown, which is loosely journaled in the frame A and extends from a point below the label-feeding mechanism to a point below the can-feeding mechanism. This rod $g$ is formed at the end below the can-feeding mechanism with a lip, which is fastened to the link $g^2$, which in turn is fastened to the arm $g^3$. When the rod $g$ is rotated by the stop $g^4$ contacting with the other end of said rod $g$, as will be done at the limit of the upward movement of the bar $f^{17}$ at a time when the supply of labels has been exhausted, the rod $g$ will move the arm $g^3$ until the end of said arm projects up above the bottom of the feeding-frame for the cans and will thereby arrest the feeding of the cans. The pin $g^5$ will also act as a stop for the label-feeding mechanism by holding the clutch member $f^{18}$ against movement.

For the purpose of regulating the machine for the different sizes of cans and in order to insure the labels being pasted evenly and properly I have shown in Fig. 4 guides which are made adjustable for different sizes of cans. The guide-plates $a^{12}$ are shown as extending over the pulley $a'$ in such manner that they guide and hold the can until same is delivered into the pocket $a^2$. One of said guide-plates is connected with the screw-threaded rod operated by the crank $a^{15}$. When different sizes of cans are fed into the machine, by operating the crank $a^{15}$ the guide-plates $a^{12}$ may be adjusted to different sizes of cans. It will be further seen by reference to Figs. 4 and 27 that one of the guides $a^{12}$ is hinged at $a^{29}$, so that its forward end may be adjusted laterally and held in adjustment by a thumb-screw $a^{14}$ and that the opposite guide is also adjustable laterally by a thumb-screw $a^{14}$, operating through a slotted projection. When the proper adjustment has been made, the thumb-screws $a^{14}$ securely hold the guide-plates in proper adjustment. For pasting on the cans narrow strips of labels I can by moving the guides direct the can in a position for labeling around the center of the can.

When the can to be labeled is released from the claw of the arm $a^4$ by means of the crank-levers $a^{16}$ $a^{17}$ and cam $a^{18}$, journaled on the shaft $a$, the hinged bottom $a^{19}$ is dropped to cause the can to be fed into the machine. (See Fig. 4.) The bottom $a^{19}$ is fixed on a shaft $a^{20}$, journaled in the frame, so that when the crank-lever $a^{16}$, also fixed to said shaft, is moved by the cam $a^{18}$ the bottom $a^{19}$ will be inclined downwardly to feed the can into the machine, and the movement of the crank-arm $a^{16}$ further operates the shaft $a^7$ through a link $a^{26}$, pivoted to an arm $a^{17}$ on said shaft, as clearly shown in Fig. 2.

The movement of the feed-arm is effected by the peculiar form of the groove $e^5$, as shown in Fig. 1. This groove is formed in part in a true circle, and during the time the roller is within that part of the groove the arm $e$ will remain at rest. It is when the roller is within the irregular part of the groove that the movement of the feed-arm is effected. A depression $a^{28}$ in the groove $e^5$ approaches the center $a$ and gives a quick movement to the arm $e^6$ just after the roller $e^4$ passes the limit of its outward stroke. The operation is such that the fulcrum of the upper end of the arm $e^6$ will be suddenly changed from the forward shoulder of the offset in the slot shown in Fig. 19 to the rear shoulder of said offset, and thereby insure the catch being withdrawn from contact with the cam, so as to insure the feed of the can freely to the supporting-roller of the machine.

When the point $x$ (see Fig. 1) reaches the roller, the feed-arm will be on its return movement and the roller will be supported on the plate $f^4$.

In order to adjust the label-feeding mechanism for varying the widths of labels, there is shown in Fig. 22 means for changing the guide-plate $f^{11}$ for different sizes of labels. The arms $f^{23}$, supporting the guide-plate $a^{11}$, are connected to sleeves, which are loosely mounted on rods $f^{24}$, extending through the frame of the machine. Between said sleeves a third sleeve is shown, which is screw-threaded, and by rotating the screw $f^{25}$ the guide $f^{11}$ can be moved as may be desired.

For the purpose of adjusting the machine for labeling cans or other devices of irregular shape, as well as allowing for varying sizes of cans, there is shown in Fig. 20 means for changing the position of one end of the roller $c$. By operating said screw $b^8$ I can move the end of said roller laterally, so as to label properly and evenly cans or other devices of larger diameter at one end than at the other.

For swinging the holding-roller backward or forward to allow for varying sizes of cans I have shown a device in Fig. 25.

Having thus described my invention, I claim—

1. In a labeling-machine, the combination of operating devices with label feeding and pasting devices consisting in part of a pivoted yoke, a roll journaled in said yoke and means to fix said yoke in different radial positions to its pivot, a feedway for the articles to be labeled adjacent to said roll, holding devices having two or more projecting arms adjacent to said feedway, and means to adjust said projecting arms in their relation to each other and to said feedway, substantially as specified.

2. In a label and article feeding mechanism, a guideway for the article to be labeled, a pair of rolls operating in a fixed position in relation to each other and to said guideway, a pivoted yoke in which the respective ends of one of said rolls are journaled, and means to adjust and fix said yoke in different radial positions, whereby said roll can be adjusted to the size of the article to be labeled.

3. In a label and article feeding mechanism, a guideway for the article to be labeled, a pair of rolls operating in a fixed position in relation to each other and to said guideway, pivoted arms in which the respective ends of one of said rolls are journaled, and means to independently adjust and fix the radial position of each of said arms and thereby the roll they carry in its relation to the other roll, for the purpose of adjusting said rolls to articles of irregular shape.

4. In a label and article feeding mechanism, a feedway, including guides for the articles to be labeled, means to adjust said guides to the size of the article to be labeled, and auxiliary devices giving an independent lateral movement to said guides to change the course of the article to be labeled in its relation to the label-feeding mechanism, whereby narrow labels can be attached in different positions on the article as desired.

5. In a label and article feeding mechanism, a feedway including guides for the articles to be labeled, means to adjust said guides to said articles and auxiliary devices, including a hinged extension to one of said guides, with means to adjust the other laterally, whereby the feed-line of said article can be changed in its relation to the label-feeding mechanism, for the purpose specified.

6. In a labeling-machine having peripheral grooves thereon, of a hinged scraper having projecting fingers adapted to extend into said grooves, and means at the respective ends of said scraper to normally hold said scraper from contact with said roll and to adjust its relation to said roll whereby the thickness of the paste can be regulated from either or both ends of the scraper.

7. In a labeling-machine, the combination with paste-feeding rolls, of a paste-box slidingly connected with said rolls, and means to adjust the position of said box in its relation to said rolls, substantially as specified.

8. In a labeling-machine, the combination of operating devices, label-feeding devices, a movable support for the labels, a clutch mechanism for operating said support, a governor having one arm resting on the labels and another arm with an arm pivoted thereto to engage and regulate the movement of said clutch mechanism, and means engaging said last-named arms to adjust said regulation, substantially as specified.

9. In a labeling-machine, the combination of operating devices, label-feeding devices, a movable support for the labels, a clutch mechanism for operating said support, a governor having one arm resting on the labels and another arm with an arm pivoted thereto to engage and regulate the movement of said clutch mechanism, a spring interposed between said last-named arms and a screw to vary the position of said arm in relation to said clutch mechanism to adjust said regulation, substantially as specified.

10. In a label and article feeding mechanism, a pair of rolls, one of which is adjustable in its relation to the size of the article to be labeled and adjusting devices at the respective ends of the other roll to adjust it to the shape of the article to be labeled, substantally as specified.

In testimony whereof I have hereunto set my hand this 31st day of October, A. D. 1902.

DANIEL W. KNEISLY.

Witnesses:
PERCY NORTON,
CHAS. I. WELCH.